United States Patent
Woods

(10) Patent No.: US 11,392,345 B1
(45) Date of Patent: Jul. 19, 2022

(54) EXTENDING AUDIO TRACKS WHILE AVOIDING AUDIO DISCONTINUITIES

(71) Applicant: BrainFM, Inc., Brooklyn, NY (US)

(72) Inventor: Kevin JP Woods, Brooklyn, NY (US)

(73) Assignee: BrainFM, Inc., Brooklyn, NY (US)

( * ) Notice: Subject to any disclaimer, the term of this patent is extended or adjusted under 35 U.S.C. 154(b) by 0 days.

(21) Appl. No.: 17/556,583

(22) Filed: Dec. 20, 2021

(51) Int. Cl.
  *G06F 3/16* (2006.01)
  *G10L 25/18* (2013.01)
  *G10L 25/24* (2013.01)
  *G10L 25/51* (2013.01)

(52) U.S. Cl.
  CPC .............. *G06F 3/165* (2013.01); *G10L 25/18* (2013.01); *G10L 25/24* (2013.01); *G10L 25/51* (2013.01)

(58) Field of Classification Search
  None
  See application file for complete search history.

(56) References Cited

U.S. PATENT DOCUMENTS

| | | | |
|---|---|---|---|
| 2007/0084473 A1* | 4/2007 | Hewett | A61M 21/00 128/898 |
| 2007/0291958 A1* | 12/2007 | Jehan | G10H 1/0025 381/103 |
| 2010/0188580 A1* | 7/2010 | Paschalakis | G06V 20/40 348/E5.062 |
| 2016/0372095 A1* | 12/2016 | Lyske | H04H 60/65 |
| 2017/0024615 A1* | 1/2017 | Allen | H03K 19/17708 |
| 2017/0371961 A1* | 12/2017 | Douglas | G06F 16/686 |
| 2018/0315452 A1* | 11/2018 | Shi | G11B 27/34 |
| 2020/0074982 A1* | 3/2020 | McCallum | G10H 1/0008 |

\* cited by examiner

*Primary Examiner* — Paul W Huber
(74) *Attorney, Agent, or Firm* — DLA Piper LLP (US)

(57) ABSTRACT

Embodiments disclosed herein extending an audio track by joining similar portions. Audio features (e.g., spectral features, modulation features) may be extracted from the audio track. The audio track may be segmented, e.g., based on the audio features, and each segment may be slid through the audio track using a timestep. In each timestep, the sliding segment may be compared to the underlying portion of the audio track and a similarity score (e.g., a cross-correlation) may be generated. A self-similarity matrix may be generated based on the comparisons involving all the segments. The self-similarity matrix may be analyzed for peak values and segments corresponding to the peak values may be joined to extend the audio track. The embodiments may be applied to any kind of audio including music, ambient noise, speech, etc.

20 Claims, 8 Drawing Sheets

EXTENDING AUDIO TRACKS WHILE AVOIDING AUDIO DISCONTINUITIES

RELATED APPLICATIONS

This application is related to U.S. Pat. Nos. 7,674,224; 10,653,857; U.S. Patent Publication No. 2020/0265827; and U.S. patent application Ser. Nos. 17/366,896, 17/505,453; all of which are incorporated herein by reference in their entirety.

BACKGROUND

For decades, neuroscientists have observed wave-like activity in the brain called neural oscillations. Aspects of these neural oscillations have been found to be related to mental states including attention, relaxation, and sleep. The ability to effectively induce and modify such mental states by noninvasive brain stimulation is desirable.

BRIEF DESCRIPTION OF DRAWINGS

Features, aspects, and advantages of the present disclosure will become apparent to those skilled in the art upon reading the following detailed description of exemplary embodiments and appended claims, in conjunction with the accompanying drawings, in which like reference numerals have been used to designate like elements, and in which:

The figures are for purposes of illustrating example embodiments, but it is understood that the present disclosure is not limited to the arrangements and instrumentality shown in the drawings. In the figures, identical reference numbers identify at least generally similar elements.

DESCRIPTION

Figure 1:
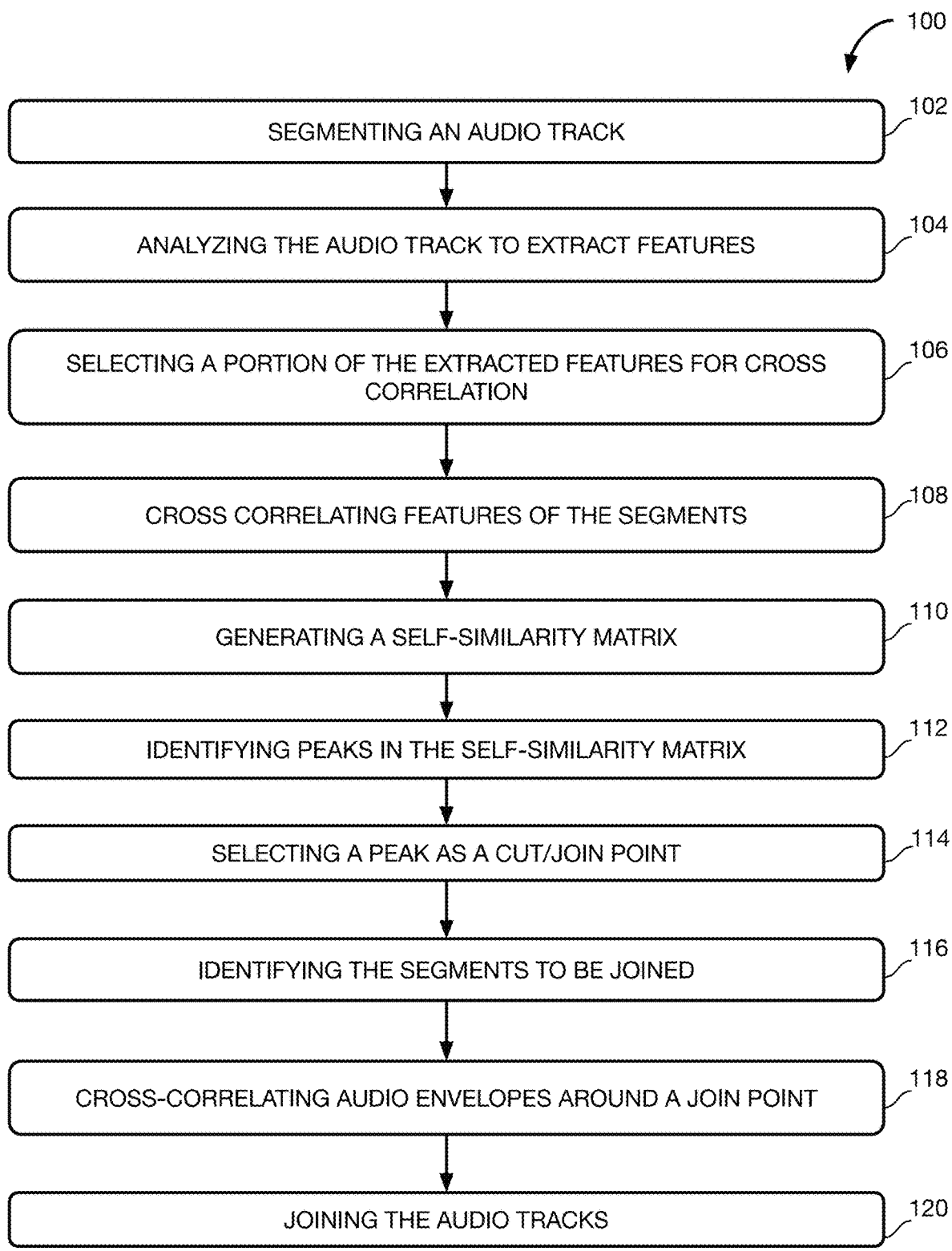
FIG. 1 depicts a flow diagram of an illustrative method of extending an audio track, according to some embodiments of the present disclosure.

Current audio playback systems are generally based on sequentially playing audio tracks; e.g., playing a first audio track from start to finish followed by a second audio track, and so forth. This has the effect of presenting variety to the user which may maintain the user's continued interest in and engagement with the audio. However, this may not be the desired result for audio used to aid focus (e.g., focusing on a task rather than paying attention to the music), sleep, or relaxation. Furthermore, switching from one audio track to the next may introduce discontinuities in audio characteristics such as a brief silence in the audio and/or a change in the audio modulation, rhythm, instrumentation, and the like. With popular music, such discontinuities may occur every 3-5 minutes (the length of a normal music track). This switching between tracks may be disruptive to the listener attempting to maintain a desired mental state (e.g., being focused). One potential solution may be to loop (e.g., repeat) a single track, but often this may still result in discontinuities because of the different audio characteristics between the "outro" (e.g., final portion) and "intro" (e.g., initial portion) of the audio track. It is therefore desirable to extend an audio track, creating a version longer than the original track by repeating audio from the original track by non-perceptible, seamless joining of various portions of the audio track such that a listener can maintain a desired mental state for a desired length of time.

Embodiments disclosed herein describe techniques for extending an audio track with non-perceptible, seamless joining of different portions of the audio track. The joining may be based on the similarity of audio characteristics within the audio track, such as similarity between amplitude modulation characteristics of different portions of the audio track. The similarity analysis for amplitude modulation may include determining characteristics (e.g., constituent frequencies) of the sound envelope, rather than the constituent frequencies of the audio itself. The sound envelope, which may move slower than the frequencies of the audio itself, is known to be a more perceptible feature of sound in the mammalian brain. Research shows that mammalian auditory system involves a modulation-frequency filter bank (e.g., allowing the brain to discriminate between modulation frequencies of the sound envelope) in the brain stem and audio-frequency filter bank (e.g., allowing the brain to discriminate between frequencies in the audio signal itself) in the cochlea. Research also shows that amplitude modulation may drive rhythmic activity in the brain, which may then be leveraged to support mental states like focus, sleep, relaxation, and/or various other mental states.

The modulation-frequency domain may generally include 0.1 Hz-100 Hz (compared to audible frequency range of 20 Hz-20 KHz). Modulation frequencies (or modulation rates) may refer to the spectra of amplitude changes in an underlying higher-frequency signal (the audio-frequency "carrier"). Extraction of the modulation characteristics may include, e.g., determining the envelope of a sound (broadband or filtered sub-bands) via a technique like Hilbert transform; followed by a spectral analysis of this envelope via methods like Fast Fourier Transforms (FFTs) or modulation domain bandpass filtering (e.g., to determine the spectrum of the sound envelope), visual filtering on the spectrographic representation of the sound envelope, and/or any other technique of extracting modulation characteristics.

The usage of modulation characteristics for audio track extension for determining similarity is just an example; and usage of other characteristics should also be considered within the scope of this disclosure. For example, one or more embodiments may use acoustic characteristics such as audio-frequency, brightness, complexity, musical surprise, etc. that may bear on effectiveness, distractibility, and modification of mental states, etc. One or more of these characteristics may be used to provide an audio output targeted to elicit a desired mental state, whereby the duration of the audio track can be arbitrarily adjusted to different time durations without sounding repetitive, without introducing discontinuities, or otherwise losing its effectiveness of eliciting a desired mental state.

For example, an earlier segment may be joined to a later segment having similar audio characteristics as the earlier segment. Using the joining between the various portions of the audio track, the audio track may be extended. For instance, a five-minute music piece may be extended to an hour of playback. These embodiments of track extension may be applicable to environmental sounds, speech, music with poorly defined beats (e.g., ambient, metrically-variable music), music with well-defined beats, and/or any other type of audio content.

In an example method of extending an audio track, multi-dimensional features of the audio track (e.g., amplitude modulation features) may be extracted. The extracted multi-dimensional features may be in the form of a spectrogram, a cochleagram, and/or any other form of audio features. The extracted multi-dimensional features may be used to generate an "image" representation of the sound. For example, the image representation may be a 2-dimensional image with the frequency spectrum (e.g., of the sound envelope) on the y-axis and the time on the x-axis.

To determine the similarity between different portions of the audio track, the audio track (e.g., the features extracted from the audio track) may be divided into a plurality of segments. The size of the segment may be based on the extracted multi-dimensional features. In the case of rhythmic sounds such as music, the segment size may comprise a certain number of beats (e.g., four beats; one beat is often assigned the value of a quarter-note in western popular music); for non-rhythmic sound such as ambient sound, the segment size may be based on a time duration (e.g., an absolute time duration of 3 seconds).

Each of the segments may then be compared with the entirety of the audio track. For example, a timestep smaller than the segment size may be chosen, and a given segment may be slid across the audio track using the timestep. At each time step, the features of the segment may be compared to the features of the underlying portion of the audio track associated with the current timestep. The comparison may include, for example, cross-correlation, difference, division, and/or any other type of similarity analysis. Therefore, the sliding and comparison operations for each segment may generate a similarity vector indicating the similarity between the segment and different portions of the audio track at each timestep.

The sliding and comparison operations may be performed for each of the segments of the audio track thereby generating a similarity vector for each segment. The similarity vectors for all the segments may be combined to generate a self-similarity matrix. In an example self-similarity matrix, each row may be a similarity vector for a different segment and may contain column entries for each time step. Therefore, if there are M number of segments and T number of timesteps, the self-similarity matrix has 2 dimensions with size M*T. An element (X,Y) of the self-similarity matrix may be a numerical value indicating the similarity between the corresponding segment X and the corresponding underlying portion of the audio track at timestep Y.

Similarity between different portions of the audio track may be determined based on an analysis of the self-similarity matrix. For example, within the self-similarity matrix, the elements may include peaks (e.g., an element with a higher value than its neighbors) showing a higher similarity between the corresponding portions. The joining for audio track extension may be for the segments corresponding to these peaks. A thresholding may be applied during an analysis of the self-similarity matrix and the segments associated with a predetermined number of highest-valued peaks may be identified as candidates for joining. In addition to similarity (as indicated by the peaks), the joining may be based on other considerations such as whether the corresponding segment appears toward the beginning of the audio track or towards the end of the audio track, whether the corresponding segment was used for extension before, and/or any other considerations.

When two segments are selected for joining, a cross-correlation (and/or any other form of similarity analysis) may be performed between the envelopes of the segments. The cross-correlation may determine an additional time-shift between the two segments, smaller than the segment size, which may be imposed before they are joined.

The optimal point for joining two segments (e.g, via a rapid crossfade) may then be determined by finding a location with relatively low energy such as, for example, a zero crossing or where the sound envelope has a low value. When the joining point is determined, the corresponding segments are joined to extend the audio track.

In an embodiment, a computer-implemented method is provided. The method may include extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments, and for each selected segment: comparing the multi-dimensional features of the segment with the multi-dimensional features of the second plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

In another embodiment, a system is provided. The system may include a processor; and a tangible, non-transitory computer readable medium storing computer program instructions, that when executed by the processor, cause the system to perform operations comprising: extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments and for each selected segment: comparing the multi-dimensional features of the segment with the multi-dimensional features of the plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

In yet another embodiment, a tangible, non-transitory computer readable medium is provided. The tangible, non-transitory computer readable medium may store computer program instructions, that when executed by a process, may cause operations including extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments and for each selected segment: comparing the multi-dimensional features of the segment with the multi-dimensional features of the plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

FIG. 1 illustrates an example method 100 performed by a processing device (e.g., smartphone, computer, smart speaker, etc.), according to some embodiments of the present disclosure. The method 100 may include one or more operations, functions, or actions as illustrated in one or more of blocks 102-120. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

At block 102, an audio track may be segmented. The segmentation may be based on one or more temporal aspects of the audio track. In the embodiments where the audio track contains music, the segmentation may be based on rhythmic or temporal aspects of the music such as beats and/or tempo. For example, a beat-finder or a tempo-finder may be run on the audio track to determine the metrical grid of the music (e.g., to determine how the music is temporally organized, and the rate of notes over time). For example, the determined metrical grid may include the length (e.g., in milliseconds) of a measure, a quarter-note, a half-note, a whole-note, etc. Using the determined metrical grid, the segment size may be selected as having, for example, 4 or 8 beats (1 or 2 measures for 4/4 time signature), which may amount to several seconds of the audio track (e.g., 1-5 seconds). However, in the embodiments where the audio track is non-rhythmic (e.g., audio track containing an ambient sound), the segmentation may be performed using a time duration (e.g., 1-5 seconds) without necessarily tracking the beats.

The length of the segments (e.g., 1-5 seconds) may be considered relatively long in the context of audio applications, however the relatively longer segments may more likely provide a coherent joining. An aspect of the disclosure is to find segments in the audio track that can be interchanged without disrupting larger-scale structure in the audio (e.g., for a given segment, finding segments that are surrounded by a similar context). For music, a longer segment may encompass a musically meaningful amount of time. If the segment is relatively short (e.g., 200 ms) for an audio track containing music, joining segments may have acoustic continuity but may be musically disruptive.

In some embodiments, the segments may be non-overlapping, e.g., a second segment may begin at the end of the first segment. In other embodiments, the segments may be overlapping, e.g., a portion of the second segment may lie within the first segment (e.g., the second segment may begin before the first segment ends). The segments may have a same length or may have different lengths.

As an analogy to joining audio segments for an audio track containing music, consider joining text segments of a written passage. If text segments include only single letters and the joining is between the single letter segments, the result may be an incomprehensible, jumbled text. If the text segments include single words and the joining is between single word segments, the result may also be incomprehensible, jumbled text (albeit less bad than the one generated using single letter segments). However, if the segments include several words or a phrase, the joining between these segments may result in a more comprehensible text (possibly even syntactically well-formed). An exception to using the longer segments may be operating on non-musical audio (e.g., ambient sound such as a café noise), where shorter segments may be used because a musical continuity or coherence may not necessarily be an issue.

At block 104, the audio track may be analyzed to extract multi-dimensional features. For example, multi-dimensional features (or representations) such as spectrogram or cochleagram (e.g., indicating frequency over time), MFCCs (Mel Frequency Cepstral Coefficients), modulation characteristics (e.g., indicating spectral or temporal modulation over time), and/or other audio features may be extracted from an audio track. The analysis and extraction may be performed on the broadband audio signal (e.g., entire signal) or a portion of the audio signal (e.g., a frequency sub-band of the signal). As an example, the extracted multi-dimensional features may include amplitude modulation features of the audio track. The amplitude modulation features may correspond to energy across different modulation frequencies over time in the sound envelope of the audio track. Amplitude modulations in the sound envelope have effects on the human brain and mental states that differ depending on the characteristics of the modulation.

At block 106, a portion of the extracted multi-dimensional features may be selected for cross-correlation. In some embodiments, the selected features may include spectrogram or cochleagram, which may indicate energy in frequency bands over time. In other embodiments, the selected features may include a portion of the spectrogram, where the portion may be restricted for a frequency range for a more efficient analysis. Additionally or alternatively, the selected features may include Mel-frequency cepstral coefficients (MFCCs), modulation characteristics, and/or any other type of extracted audio features. The selection of features may be based on additional analyses of the audio. For example, if an audio analysis determines that the high frequency region of a spectrogram contains relatively little energy or relatively little information, that region may be discarded during the selection; this may be desirable in this example to reduce computational cost. The selected features (or features in general) may be referred to as feature vectors. For instance, each segment may have a corresponding feature vector containing the corresponding features as they change over the duration of the segment.

At block 108, a feature vector of one or more segments may be cross-correlated with the feature vector of other segments forming at least a portion of the audio track. For example, a timestep (generally shorter than the segment size) may be selected, and a given segment may be slid through at least a portion of the audio track in the increments of the time step. At each time step, the cross-correlation (or any other similarity measurement) between the segment and the underlying portion of the audio track that the segment is sliding over is recorded. This sliding process may yield a cross-correlation function (or any other similarity indication) that may indicate which segments in the at least a portion of the audio track best match the sliding segment. It should however be understood that cross-correlation is just an example of comparing the features of the sliding segment with the features of the underlying portion of the audio track, and other forms of comparison should also be considered within the scope of this disclosure. Alternatives to cross-correlation may include, for example, difference, division, etc.

In some embodiments, the timestep for cross-correlation may be a unit fraction of segment size in samples (where the digital audio file is a sequence of samples intended to be played back at a predefined sample rate to generate a pressure waveform). For example, if a segment has N samples, the cross-correlation timestep may contain N/2, N/3, N/4, N/5, . . . , etc. samples. The segment size may be chosen so as to allow cross-correlation at particular resolutions, e.g., a smaller segment size and corresponding smaller timestep for a higher resolution. Regardless of the segment and timestep sizes, the sliding and comparing operations for each segment may generate a similarity vector.

At block 110, a self-similarity matrix is generated. The self-similarity matrix may be based on cross-correlations (and/or any form of comparison) performed in block 108 and may contain the similarity vectors generated for the plurality of segments. In other words, within the self-similarity matrix, a given row may represent the cross-correlation of the corresponding segment with the segments forming at least a portion of the audio track. Accordingly, the self-similarity matrix may have a size of M (rows)*T (columns) with M being the number of segments and T being the number of timesteps in the at least a portion of the audio track (which may be based on the size of timesteps—the smaller the timestep, the larger the T). The self-similarity matrix may represent the similarity of the M predefined segments to other segments forming at least a portion of the audio track. However, as described above, cross-correlation is just but an example of the comparison, and other forms of comparisons should also be considered within the scope of this disclosure. For example, other forms of comparisons such as sliding dot-product, subtraction, and/or division should be considered as alternatives or additions to cross-correlation.

At block 112, peaks in the self-similarity matrix may be identified. Each peak in the self-similarity matrix corresponds to a pair of segments that are more likely to be similar to each other than to neighboring segments. Therefore the identified peaks may be used in the subsequent steps for joining the likely similar segments. Identifying the peaks to use in joining may include detecting peaks that are higher than other peaks by thresholding a larger set of peaks, for example by keeping the highest peaks (e.g., 5 highest peaks) while dropping a peak when a higher one is found, or finding all peaks and keeping only the highest 5% of peaks. At the end of block 112, a list of the highest peaks and/or the segment-pairs with the highest peaks from the self-similarity matrix may be generated.

At block 114, a peak may be selected as a cut/join point. The selection may be based on factors such as peak height (e.g., which may indicate the level of similarity between corresponding segment and the underlying portion of the audio track), location (e.g., the location of the corresponding segment within the audio track), and/or history of usage of the corresponding segment (e.g., a previously used segment may be avoided for joining to reduce the probability of undesirable repetition in music). These are just a few example considerations in the peak selection, and other peak selection considerations should also be considered within the scope of this disclosure.

At block 116, the segments to be joined may be identified. The identified segments may correspond to the peak selected as the cut/join point. Accordingly, the identified segments may include (i) the segment at the peak itself (e.g., the portion of the track representation that was being slid over when the high-valued comparison occurred), and (ii) the predetermined segment corresponding to the row containing the peak (e.g., the segment that was sliding over to create the row in the self-similarity matrix). The identified segments, when joined in the subsequent steps, may be conceptualized as effectively jumping the audio track backward or forward in time. For instance, a first identified segment (of the pair indicated by a selected peak) may be farther along in time (e.g., closer to the end of the original audio track) than a second identified segment (e.g., which may be closer than the first identified segment to the start of the original audio track). Therefore, when the second identified segment is joined after the first identified segment, the audio track may be extended by effectively jumping the audio track backward in time. Alternatively, when the first identified segment is joined after the second identified segment, the audio track may be extended by effectively jumping forward in time (i.e., skipping the portion of audio between the second and first audio segments) to a similar segment.

At block 118, audio envelopes around a join point (i.e., the envelopes of the two segments in the pair) may be cross-correlated. Their broadband envelopes may be used, or envelopes of filtered sub-bands (envelopes may be determined by, e.g., Hilbert transform, peak interpolation, and/or other methods). The cross-correlation may be performed to determine the timeshift required between the identified segments to minimize any perceived discontinuities in the joined audio. Once a maximum in the envelope cross-correlation is found, the required timeshift in samples is known and implemented prior to the joining operation. The identified segments may be quite long (contain a large number of audio samples) and therefore a join point may have to be identified with relatively more precision within the duration of the two similar segments being joined. This join point is the region over which the switch from one audio track to the other occurs (e.g., via a rapid crossfade). This region may be rather brief, with the crossfade lasting 10-500 ms (e.g., not longer than half a second and generally as short as 10 ms) to avoid the perception of overlapped tracks. To determine the join point, the system may look for the lowest-energy (e.g., quietest) point within the segment(s) because it may be desirable to make the join at a point where the audio is quiet rather than loud. Determining a quiet point in the segment(s) to make the join can be done using the sum of the segments (e.g., the overlapped audio from the matching pair of segments following the determined timeshift), or using only one segment alone since the two segments are very similar. The determination of a quiet point can be done, for example, via an envelope of the signal or the raw signal (waveform).

At block 120, two portions of the audio track associated with the identified segments may be joined. For example, a first portion of the audio track may correspond to the audio from the start of the track up to and including a first segment, while a second portion of the audio track may correspond to the audio from the second segment to the end of the track. The joining process may include overlapping (including any determined timeshift) the first and second segments, followed by removing or reducing the loudness to zero a portion of each segment before or after the join point. As a result, the join segment (e.g., the segment in the joined audio output that is the combination of the overlapped pair of segments) may include at least a portion of the first segment and the second segment. Different methods may be used for joining two portions of the audio track. In one embodiment, the two portions of the audio tracks are crossfaded into one another over a short period of time (which may be different from the segment size). In another embodiment, the audio tracks may be joined at coincident zero-crossings within the join segment. In both these embodiments, the exact join point (e.g., center of the crossfade) can be shifted to lower energy points in time nearby, generally within the original join segment.

In some embodiments, the extended audio track may be generated dynamically during a playback of the audio track. For example, a user may, during the playback of the audio track, provide an instruction on a user interface associated with a processing device (e.g., by visually stretching the timeline for playback of an audio track, by using a voice command to extend the track, etc.), and the extended audio track may be dynamically extended. In other embodiments, the user may provide a desired length of the audio track before the beginning of the playback, and the extended audio track may be generated prior to playback. In another embodiment, the user provides no explicit instruction, but the track continues to play indefinitely with dynamic extension until playback is stopped by the user. In yet another embodiment the track may be dynamically extended in response to sensor data or other input not explicitly given by the user. For example, a track may dynamically extend until environmental conditions change as assessed by a microphone or light meter.

The selection of the first and second segments may be based on additional or alternative considerations. For instance, the excessive repetition of the segments may be avoided as it may be undesirable to repeat the same segment back to back more than 2 or 3 times. To address this concern, in some embodiments the previous usage of segment may be considered when selecting the first and second segments (e.g., when picking a peak in the self-similarity matrix). For example, peaks that have previously been used as joins, or in which one of the two segments indicated by the peak has been used in a join, may be down-weighted or removed from consideration when selecting new peaks to use in a join. In some embodiments, joining a segment to itself may be avoided. The selection of segments to join (i.e., peak selection) may also be based on the desired time between joins in the resulting extended track. For example, it may be undesirable to have join points occur too frequently, and so peaks that would create a join shortly after the latest join may be down-weighted in favor of peaks that would allow a longer duration of the original track to play before another join occurs.

In some embodiments, the "intro" (e.g., initial portion of the track) and "outro" (e.g., final portion of the track) of an audio track may be disallowed as sections to be joined. For example, the selection of the first and/or second segment may be limited to audio segments that occur after a time interval (e.g., 1 minute) from the beginning of the audio track and/or before a time interval (e.g., 1 minute) from the end of the audio track.

In some embodiments, some portions of the audio track may be excluded from repetition. For instance, a portion of the audio track may be determined to be an outlier with markedly different characteristics compared to the other portions of the audio track. As an example, in a café ambient sound, a portion may haven audio recording of a breaking glass, which may have to be avoided from repeating in the extended audio track. This portion may then be disallowed as a join point and/or considered as a less favored portion for repetition. Such preference may be expressed by, for example, negative-weighing the one or more segments corresponding to the portion in the self-similarity matrix. For instance, the entries in the self-similarity matrix for the corresponding segments may be set to all zeros. This is just an example of enforcing the preference and other methods should also be considered within the scope of this disclosure.

In some embodiments, the first join segment may be selected such that the audio track plays unaltered for a period of time before the first alteration occurs. In other embodiments, the track extension may be designed to preserve a structure of the audio track by limiting the joining of segments from within portions of the audio track. In some embodiments, all parts of the audio track may be available to be used for joining segments, minimizing the likelihood that some portions of the audio track may be left out completely.

Figure 2A:
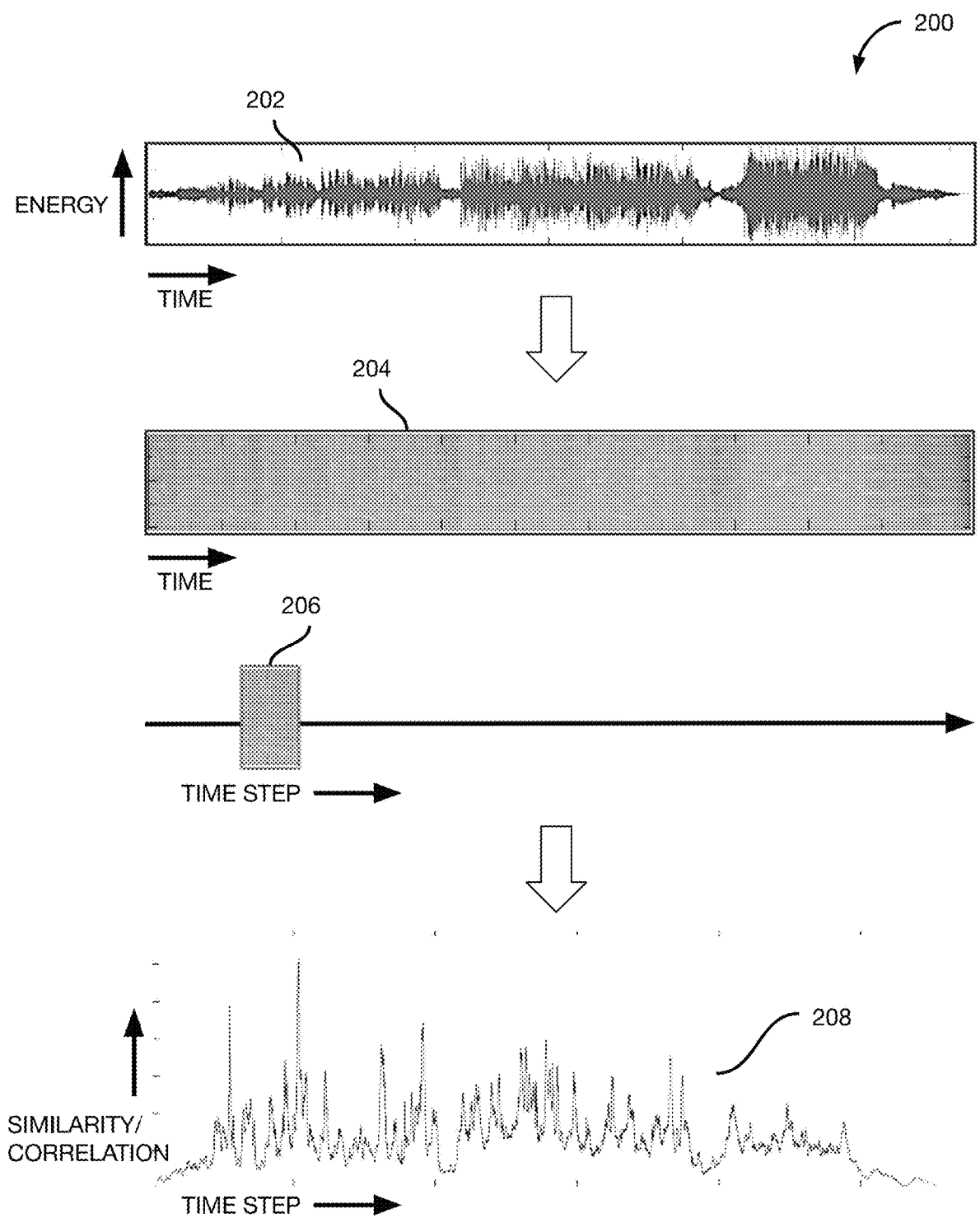
FIG. 2A depicts a process diagram of an illustrative method of generating a self-similarity matrix, according to some embodiments of the present disclosure.

FIG. 2A depicts a process diagram 200 of comparing (e.g., cross-correlating) a segment of an audio track with the entirety of audio track, according to some embodiments of the disclosure. As shown, an audio track 202 may be depicted as a distribution of energy over time. The audio track 202 may be analyzed to extract a feature vector 204. The feature vector 204 may include, e.g., spectrogram, cochleagram, MFCCs, and/or modulation characteristics. A segment 206 of the feature vector may be selected and slid across the feature vector 204 using a time step. A cross-correlation and/or any other type of similarity function may be calculated between the segment 206 and the underlying portion of the feature vector 204. Based on the sliding, a correlation (and/or similarity) function 208 may be generated that may indicate the similarity between the segment 206 and the underlying portion of the feature vector 204. The function 208 may also be referred to as a similarity vector.

Figure 2B:
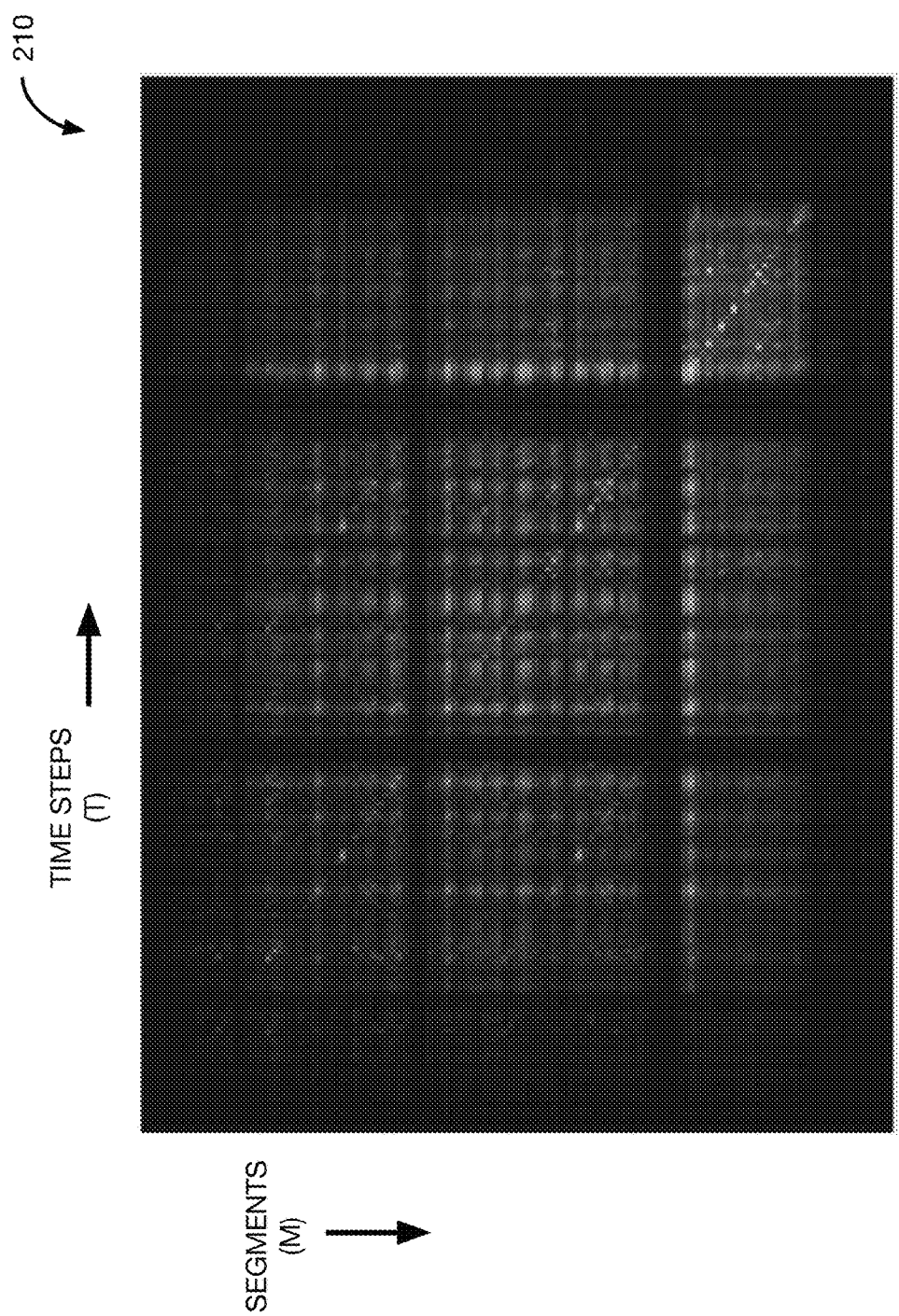
FIG. 2B depicts an illustrative self-similarity matrix, according to some embodiments of the present disclosure.

The feature vector 204 may be divided into multiple segments (segment 206 is an example of one such segment), and the cross-correlation (and/or similarity) function 208 may be calculated for each segment. The cross-correlation (and/or similarity) function 208 from the multiple segments may then be used to generate a self-similarity matrix. FIG. 2B shows an example self-similarity matrix 210 with M rows $\{r1, \ldots, rM\}$ and T columns $\{c1, \ldots, cT\}$. The rows of the self-similarity matrix 210 may correspond to a number of segments (M). The columns of the self-similarity matrix 210 may correspond to the number of time steps (T). The self-similarity matrix 210 may therefore indicate the similarity relationships between the different portions of the audio track. As shown, the brightness of the entry (or a pixel) at matrix location (m,t) may correspond to the level of similarity between a given segment m and the underlying portion of the audio track at timestep t. The leading diagonal of the self-similarity matrix 210 may show the strongest relationship as the leading diagonal may indicate the similarity analysis between a segment and itself. Therefore, the leading diagonal may be left out in the subsequent peak analysis.

Peak thresholding may be applied to the self-similarity matrix 210 to determine which segments may be suited to be joined to extend an audio track. The peak thresholding may include iterating through the self-similarity matrix 210 to determine the highest peaks (as indicated by brighter pixels of the self-similarity matrix 210). For instance, five highest peaks may be determined and segments corresponding to one of the highest peaks (a peak may be selected based on other considerations such as whether a given segment has been used for joining before and/or the location of the segment within the audio track) may be joined together to extend the audio track. The self-similarity matrix 210 may therefore provide an analytical representation of the similarities within the audio track, and such representation may be used to identify the join points for similar portions to extend the audio track while avoiding discontinuities.

Figure 3A:
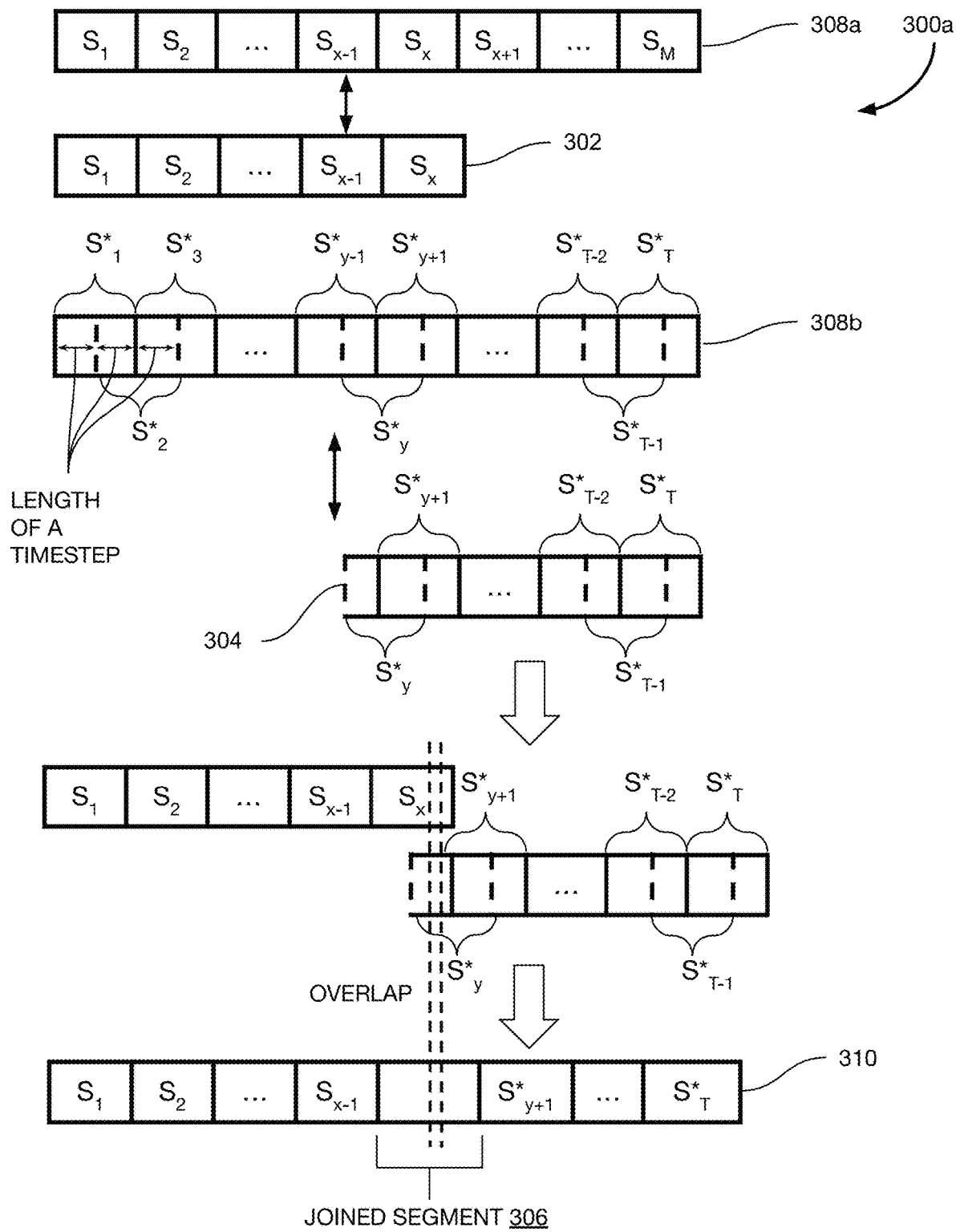
FIG. 3A depicts a process diagram of an illustrative method of joining segments to extend an audio track, according to some embodiments of the present disclosure.

FIG. 3A depicts a process diagram of an illustrative method 300a of joining segments to extend an audio track, according to some embodiments of the disclosure. For example, an audio track 308 may be divided into M segments $S_1, S_2, \ldots, S_{x-1}, S_x, S_{x+1}, \ldots, S_M$ (such segmented audio track is shown as 308a), e.g., by using segmentation of block 102 of FIG. 1. The audio track 308 may also be divided into T segments $S^*_1, S^*_2, \ldots, S^*_{y-1}, S^*y, S^*_{y+1}, \ldots, S^*T$ (such segmented audio track shown as 308b). The second segmentation to generate the T segments may be based on the number of timesteps (e.g., T timesteps as described with reference to FIGS. 2A-2B). For example, as shown, the first segment $S^*_1$ of the segmented audio track 308b may be the same as the first segment $S_1$ of the segmented audio track 308a. However, the second segment $S^*_2$ of the segmented audio track 308b may begin after a timestep (which may be smaller than the segment length of the segmented audio track 308a because T>M) and therefore sooner than the second segment $S_2$ of the segmented audio track 308a. The second segment $S^*_2$ of the segmented audio track 308b is shown spanning two timesteps, however, it should be understood that other lengths of the second segment $S^*_2$ should be considered within the scope of this disclosure. The third segment $S^*_3$ of the segmented audio track 308b is shown to be the same as the second segment $S_2$ of the segmented audio track 308a and begins before the second segment $S^*_2$ of the segmented audio track 308b has ended.

Therefore, it should be understood that the comparison granularity for join analysis (e.g., after the join segments are identified) is not limited by the predefined segment size used for generating the self-similarity matrix. The join analysis may leverage the smaller timestep (compared to the predefined segment size) for a more granular comparison to find an optimal join point for identified join segments. Furthermore, the offsetting and the sizing of the segments in the segmented audio track 308b compared to the segments of the segmented audio track 308a is not confined to the above example. For instance, the size of the segments in the segmented audio track 308b may be the length of the timestep itself (e.g., T=M), or many times greater than a timestep (e.g., T=M*10).

A first segment 302 ($S_x$) and a second segment 304 ($S^*_y$) may have been selected for joining based on, for example, the peak analysis from a self-similarity matrix (e.g., self-similarity matrix 210). The method 300a of joining a first portion of the audio signal including audio prior to and including the first segment 302 and a second portion of the audio signal including audio after and including the second segment 304 may involve skipping the segments between the first segment 302 and the second segment 304. In other words, segments $S_{x+1}, \ldots, S^*_{y-1}$ in between $S_x$ and $S^*_y$ may be absent from the resulting audio track 310. Although the resulting audio track shows segments from the segmented audio track 308a upstream of the joined segment 306 and segments from the segmented audio track 308b downstream of the joined segment 306, this is merely for explanation. Other types of segmentation information may be used to show the resulting audio track 310. Furthermore, the segmentation information of either the segmented audio track 308a or the segmented audio track 308b may not be preserved for the resulting audio track 310.

It should however be understood that the joining of first portion of the audio signal including audio prior to and including the first segment 302 with the second portion of the audio signal including the audio including and after the second segment 304 is merely an example, and other manner of joining should also be considered within the scope of this disclosure. Another example joining may be between audio up to and including the second segment 304 with the audio after and including the first segment 302. Therefore, it should generally be understood that the first segment 302 may not necessarily be the end point of the first portion of the audio signal and that the second segment 304 may not necessarily be the start point of the second portion of the audio signal.

For joining, audio envelopes (e.g., taken by Hilbert transform of the waveform, root-mean-square signal magnitude over time, or other methods of envelope calculation) between the first segment 302 and the second segment 304 may be compared using techniques such as cross-correlation, difference measurement, etc. Portions of the first segment 302 and the second segment 304 may overlap to generate a joined segment 306 in the resulting audio track 310.

Figure 3B:
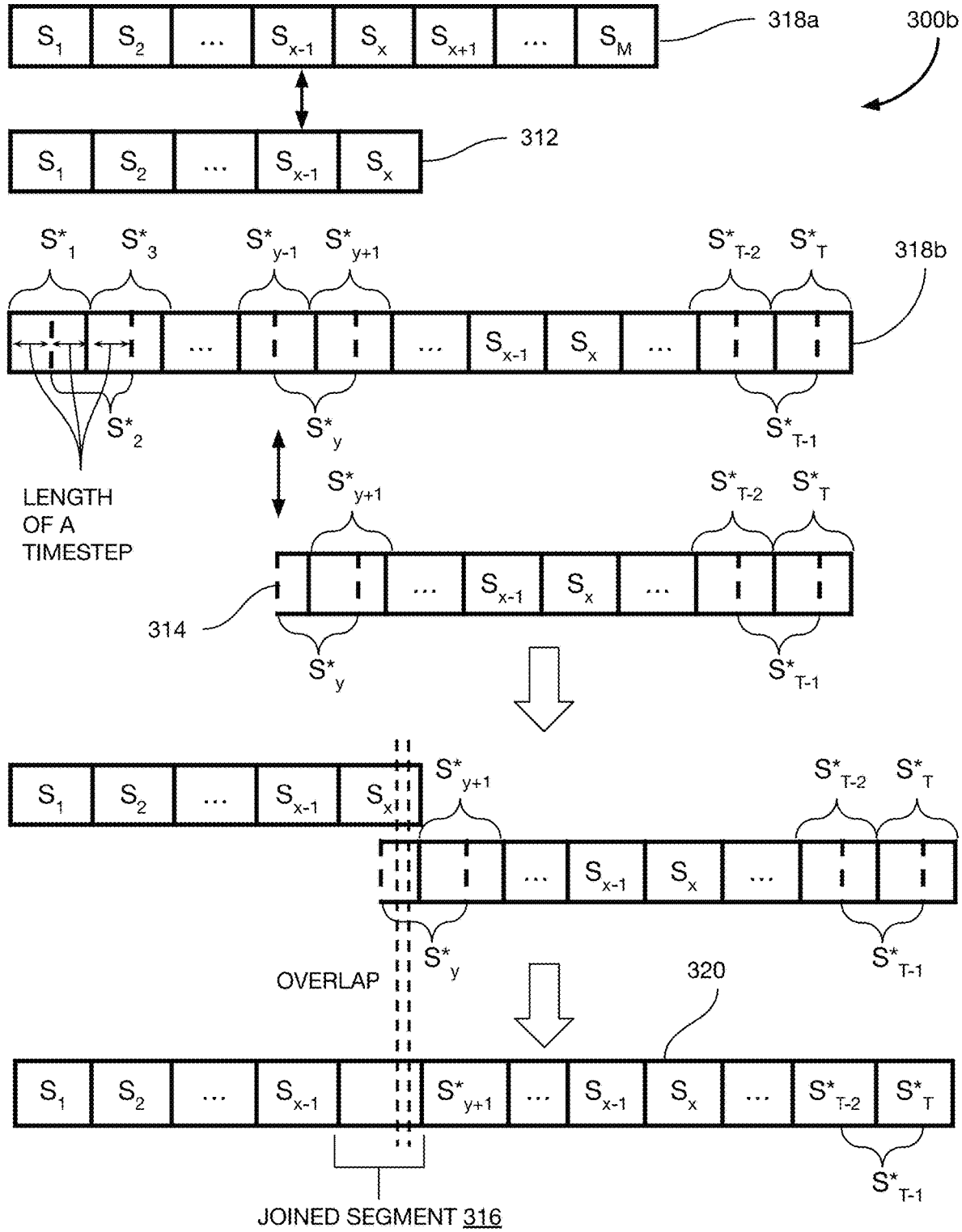
FIG. 3B depicts a process diagram of another illustrative method of joining segments to extend an audio track, according to some embodiments of the present disclosure.

FIG. 3B depicts a process diagram of another illustrative method 300b of joining segments to extend an audio track, according to an embodiment of the disclosure. For example, an audio track 318 may be divided into M segments $S_1, S_2, \ldots, S_{x-1}, S_x, S_{x+1}, \ldots, S_M$ (such segmented audio track is shown as 318a), e.g., by using segmentation of block 102 of FIG. 1. The audio track 318 may also be divided into T segments $S^*_1, S^*_2, \ldots, S^*_{y-1}, S^*_y, S^*_{y+1}, \ldots, S^*_T$ (such segmented audio track shown as 318b). The second segmentation to generate the T segments may be based on the number of timesteps (e.g., T timesteps as described with reference to FIGS. 2A-2B). For example, as shown, the first segment $S^*_1$ of the segmented audio track 318b may be the same as the first segment $S_1$ of the segmented audio track 318a. However, the second segment $S^*_2$ of the segmented audio track 318b may begin after a timestep (which may be smaller than the segment length of the segmented audio track 318a because T>M) and therefore sooner than the second segment $S_2$ of the segmented audio track 318a. The second segment $S^*_2$ of the segmented audio track 318b is shown spanning two timesteps, however, it should be understood that other lengths of the second segment $S^*_2$ should be considered within the scope of this disclosure. The third segment $S^*_3$ of the segmented audio track 318b is shown to be the same as the second segment $S_2$ of the segmented audio track 318a and begins before the second segment $S^*_2$ of the segmented audio track 318b has ended.

As described above, it should be understood that the comparison granularity for join analysis (e.g., after the join segments are identified) is not limited by the predefined segment size used for generating the self-similarity matrix. The join analysis may leverage the smaller timestep (compared to the predefined segment size) for a more granular comparison to find an optimal join point for identified join segments. Furthermore, the offsetting and the sizing of the segments in the segmented audio track 318b compared to the segments of the segmented audio track 318a is not confined to the above example. For instance, the size of the segments in the segmented audio track 318b may be the length of the timestep itself.

A first segment 312 ($S_x$) and a second segment 314 ($S^*_y$) may be selected for joining based on, for example, the peak analysis from a self-similarity matrix (e.g., self-similarity matrix 210). In this example, a first portion of the audio signal including audio prior to and including the first segment 312 is joined with a second portion of the audio signal including audio after and including the second segment 314. The resulting audio track 310 is longer than the original track 308 and segments $S^*_{y+1}, \ldots, S_{x-1}$ are repeated after the joined segment 316. Although the resulting audio track shows segments from the segmented audio track 318a upstream of the joined segment 316 and segments from the segmented audio track 318b downstream of the joined segment 316, this is merely for explanation. Other types of segmentation information may be used to show the resulting audio track 320. Furthermore, the segmentation information of either the segmented audio track 318a or the segmented audio track 318b may not be preserved for the resulting audio track 310.

It should however be understood that the joining of first portion of the audio signal including audio prior to and including the first segment 312 with the second portion of the audio signal including the audio including and after the second segment 314 is merely an example, and other manner of joining should also be considered within the scope of this disclosure. Another example joining may be between audio up to and including the second segment 314 with the audio after and including the first segment 312. Therefore, it should generally be understood that the first segment 312 may not necessarily be the end point of the first portion of the audio signal and that the second segment 314 may not necessarily be the start point of the second portion of the audio signal.

For joining, audio envelopes (e.g., taken by Hilbert transform of the waveform, root-mean-square signal magnitude over time, or other methods of envelope calculation) between the first segment 312 and the second segment 314 may be compared using techniques such as cross-correlation, difference measurement, etc. Portions of the first segment 312 and the second segment 314 may overlap to generate a joined segment 316 in the resulting audio track.

Figure 3C:
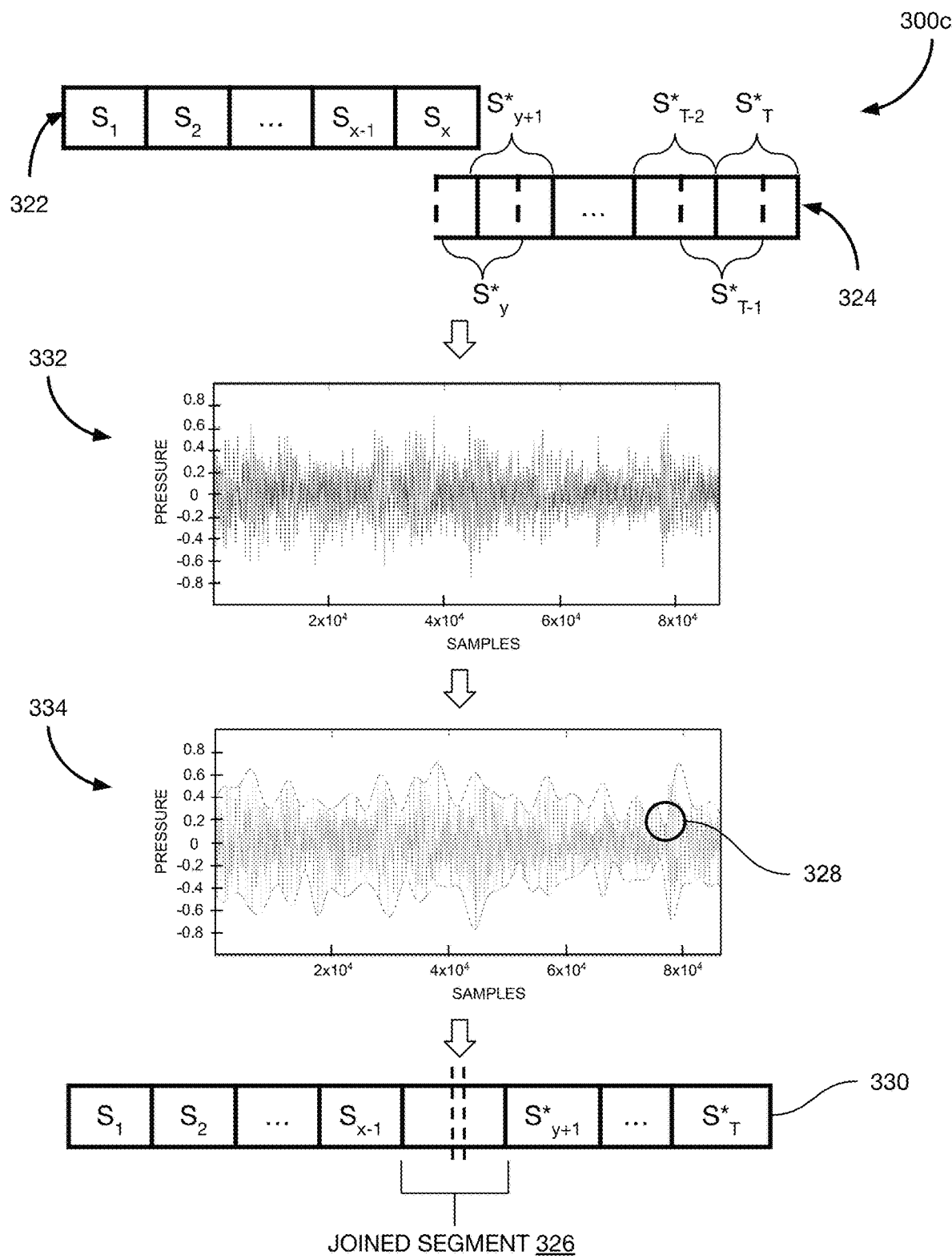
FIG. 3C depicts a process diagram of an illustrative method of calculating optimal join (overlap) point for segments to be joined, according to some embodiments of the present disclosure.

FIG. 3C depicts a process diagram of an illustrative method 300c of calculating an optimal join (overlap) point for segments to be joined, according to some embodiments of the present disclosure. A first portion 322 of an audio track is shown having a segment $S_x$ that may have to be joined with segment $S^*_y$ of a second portion 324 of the audio track. To determine the optimal point for joining $S_x$ and $S^*_y$, the audio signals may be summed (and/or combined in any other way) to generate a waveform 332. Using the waveform 332, an envelope of the waveform 334 may be generated. Using the envelope of the waveform 334, a low point 328 may be identified corresponding to a point with a relatively lower energy level when the audio signals from the two segments $S_x$ and $S^*_y$ are combined. The low point 328 may therefore be used to identify a join point within the joined segment 326 to create the extended audio track 330.

Figure 4:
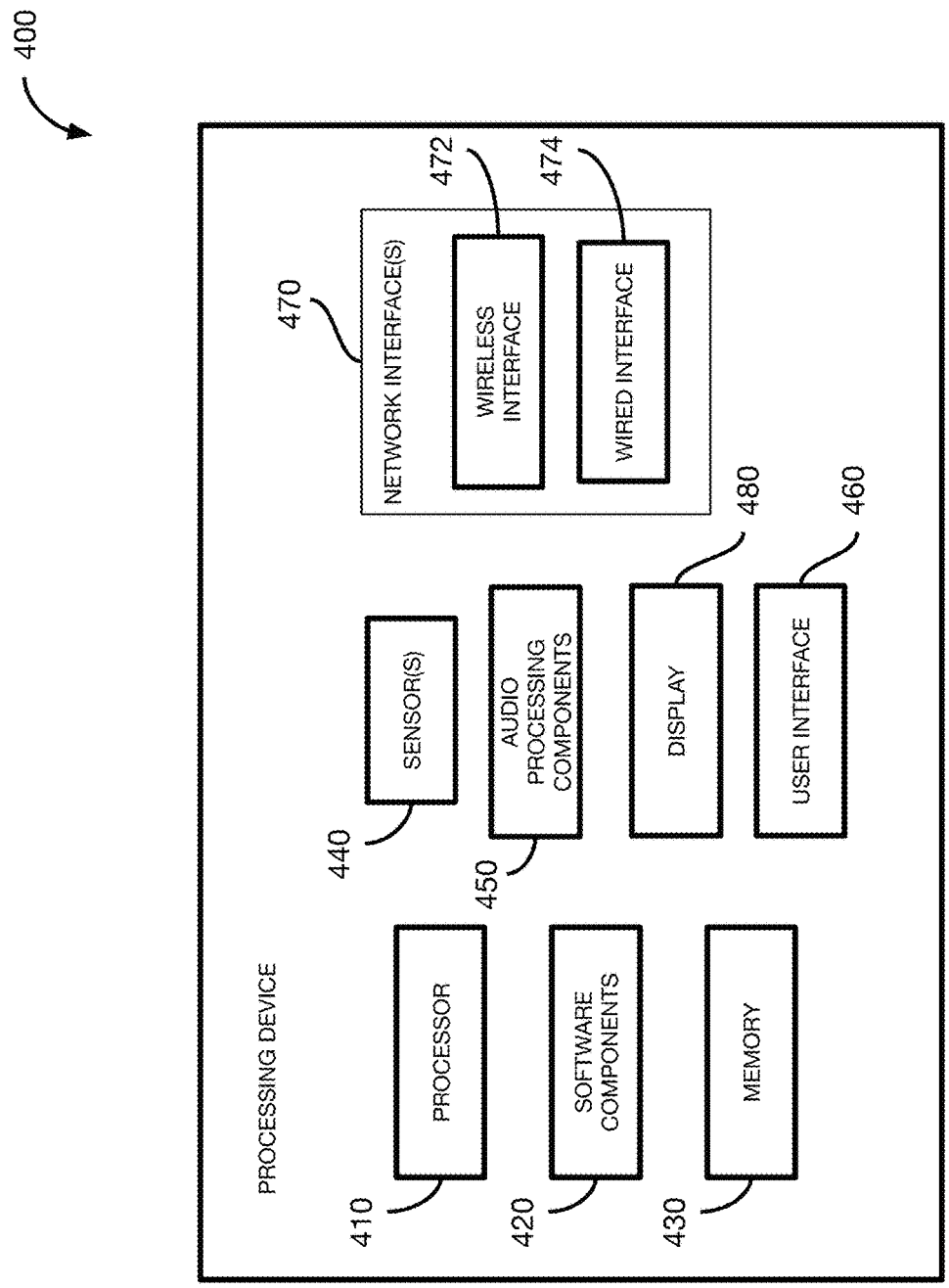
FIG. 4 depicts a functional block diagram of an illustrative processing device according to some embodiments of the present disclosure.

FIG. 4 shows a functional block diagram of an illustrative processing device 400 that can implement the previously described method 100 and processes 200, 300a, and 300b. The processing device 400 includes one or more processors 410, software components 420, memory 430, one or more sensor inputs 440, audio processing components (e.g. audio input) 450, a user interface 460, a network interface 470 including wireless interface(s) 472 and/or wired interface(s) 474, and a display 480. The processing device may further include audio amplifier(s) and speaker(s) for audio playback. In one case, the processing device 400 may not include the speaker(s), but rather a speaker interface for connecting the processing device to external speakers. In another case, the processing device 400 may include neither the speaker(s) nor the audio amplifier(s), but rather an audio interface for connecting the processing device 400 to an external audio amplifier or audio-visual playback device.

In some examples, the one or more processors 410 include one or more clock-driven computing components configured to process input data according to instructions stored in the memory 430. The memory 430 may be a tangible, non-transitory computer-readable medium configured to store instructions executable by the one or more processors 410. For instance, the memory 430 may be data storage that can be loaded with one or more of the software components 420 executable by the one or more processors 410 to achieve certain functions. In one example, the functions may involve the processing device 400 retrieving audio data from an audio source or another processing device. In another example, the functions may involve the processing device 400 sending audio data to another device or a playback device on a network.

The audio processing components 450 may include one or more digital-to-analog converters (DAC), an audio preprocessing component, an audio enhancement component or a digital signal processor (DSP), and so on. In one embodiment, one or more of the audio processing components 450 may be a subcomponent of the one or more processors 410. In one example, audio content may be processed and/or intentionally altered by the audio processing components 450 to produce audio signals. The produced audio signals may be further processed and/or provided to an amplifier for playback.

The network interface 470 may be configured to facilitate a data flow between the processing device 400 and one or more other devices on a data network, including but not limited to data to/from other processing devices, playback devices, storage devices, and the like. As such, the processing device 400 may be configured to transmit and receive audio content over the data network from one or more other devices in communication with the processing device 400, network devices within a local area network (LAN), or audio content sources over a wide area network (WAN) such as the Internet. The processing device 400 may also be configured to transmit and receive sensor input over the data network from one or more other devices in communication with the processing device 400, network devices within a LAN or over a WAN such as the Internet.

As shown in FIG. 4, the network interface 470 may include wireless interface(s) 472 and wired interface(s) 474. The wireless interface(s) 472 may provide network interface functions for the processing device 400 to wirelessly communicate with other devices in accordance with a communication protocol (e.g., any wireless standard including IEEE 802.11a/b/g/n/ac, 802.15, 4% mobile communication standard, and so on). The wired interface(s) 474 may provide network interface functions for the processing device 400 to communicate over a wired connection with other devices in accordance with a communication protocol (e.g., IEEE 802.3). While the network interface 470 shown in FIG. 4 includes both wireless interface(s) 472 and wired interface(s) 474, the network interface 470 may in some embodiments include only wireless interface(s) or only wired interface(s).

The processing device may include one or more sensor(s) 440. The sensors 440 may include, for example, inertial sensors (e.g., accelerometer, gyroscope, and magnetometer), a microphone, a camera, or a physiological sensor such as, for example, a sensor that measures heart rate, blood pressure, body temperature, EEG, MEG, Near infrared (fNIRS), or bodily fluid. In some example embodiments, the sensor may correspond to a measure of user activity on a device such as, for example, a smart phone, computer, tablet, or the like.

The user interface 460 and display 480 can be configured to facilitate user access and control of the processing device. Example user interface 460 includes a keyboard, touchscreen on a display, navigation device (e.g., mouse), microphone, etc. Through the user interface 460, the user may provide instructions to extend an audio track to a desired length.

Figure 5:
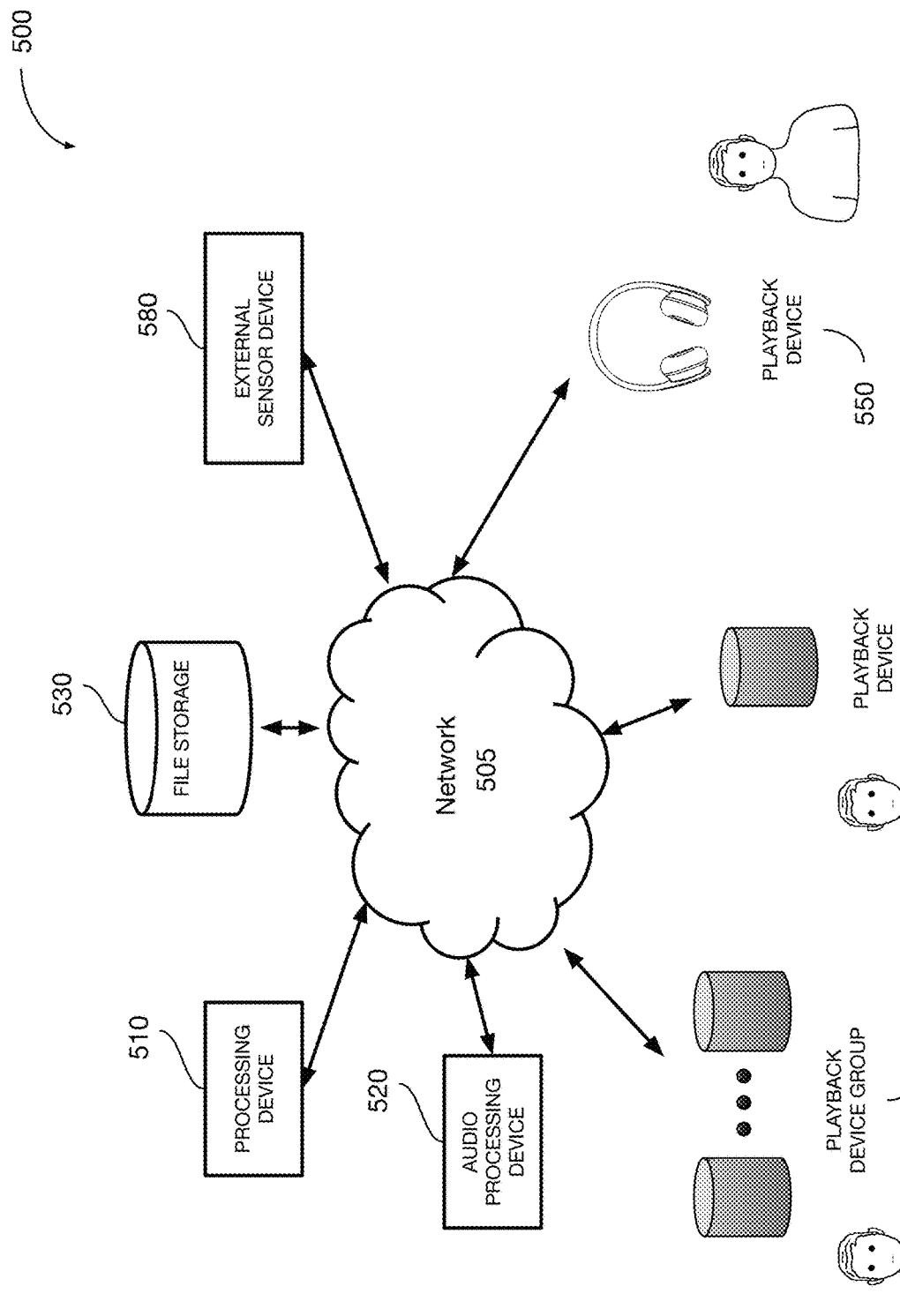
FIG. 5 depicts an illustrative system with various components for extending an audio track, according to some embodiments of the present disclosure.

Aspects of the present disclosure may exist in part or wholly in, distributed across, or duplicated across one or more physical devices. FIG. 5 shows one such illustrative system 500 in which the aspects of the present disclosure may be practiced. The system 500 illustrates several devices (e.g., computing device 510, audio processing device 520, file storage 530, playback device 550, 560, and playback device group 570) interconnected via a data network 505. Although the devices are shown individually, the devices may be combined into fewer devices, separated into additional devices, and/or removed based upon an implementation. The data network 505 may be a wired network, a wireless network, or a combination of both.

In some example embodiments, the system 500 can include an audio processing device 520 that can perform various functions, including but not limited to audio processing. In an example embodiment, the system 500 can include a computing device 510 that can perform various functions, including but not limited to, aiding the processing by the audio processing device 520. In an example embodiment, the computing devices 510 can be implemented on a machine such as the previously described processing device 400.

In an example embodiment, the system 500 can include a storage 530 that is connected to various components of the system 500 via a network 505. The connection can also be wired (not shown). The storage 530 can be configured to store data/information generated or utilized by the presently described techniques. For example, the storage 530 may store an audio track prior to the execution of the method 100 and an extended audio track generated by the method 100.

In an example embodiment, the system 500 can include one or more playback devices 550, 560 or a group of playback devices 570 (e.g. playback devices, speakers, mobile devices, etc.). In some example embodiments, a playback device may include some or all of the functionality of the computing device 510, the audio processing device 520, and/or the file storage 530. As described previously, a sensor can be based on the audio processing device 520 or it can be an external sensor device 580 and data from the sensor can be transferred to the audio processing device 520.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method comprising:
   extracting multi-dimensional features from an audio signal;
   segmenting the audio signal into a first plurality of segments each having a segment size and extracted multi-dimensional features;
   segmenting the audio signal into a second plurality of segments each having the segment size and the extracted multi-dimensional features;
   selecting at least one segment from the first plurality of segments, and for each selected segment:
      comparing the multi-dimensional features of the segment with the multi-dimensional features of the second plurality of segments;
   generating a self-similarity matrix having values indicating comparisons of the multi-dimensional features of the selected segment with multi-dimensional features of the second plurality of segments;
   selecting a first segment from the first plurality of segments and a second segment from the second plurality of segments, wherein the first and second segments correspond to a value in the self-similarity matrix that is greater than a threshold; and
   joining a first portion of the audio signal and a second portion of the audio signal, wherein the first portion of the audio signal includes the first segment, and wherein the second portion of the audio signal includes the second segment.

2. The method of claim 1, wherein extracting the multi-dimensional features from the audio signal further comprises:
   extracting, from the audio signal, at least one of a spectrogram, a cochleagram, an amplitude modulation spectrum, or mel-frequency cepstral coefficients.

3. The method of claim 1, wherein the multi-dimensional features comprise at least a spectral distribution on one axis and time on another axis.

4. The method of claim 1, wherein the time difference between the start of adjacent segments is smaller than the segment size.

5. The method of claim 1, wherein the joining of the first portion of the audio signal and the second portion of the audio signal includes overlapping a portion of the first segment and a portion of the second segment.

6. The method of claim 5, wherein the overlapping corresponds to crossfading an ending portion of the first segment with a beginning portion of the second segment.

7. The method of claim 1, wherein the first portion of the audio signal includes audio prior to the first segment and wherein the second portion of the audio signal includes audio after the second segment.

8. The method of claim 1, wherein the first portion of the audio signal further includes audio prior to the second segment and wherein the second portion of the audio signal includes audio after the first segment.

9. A system comprising:
a processor; and
a tangible, non-transitory computer readable medium storing computer program instructions, that when executed by the processor, cause the system to perform operations comprising:
extracting multi-dimensional features from an audio signal;
segmenting the audio signal into a first plurality of segments each having a segment size and extracted multi-dimensional features;
segmenting the audio signal into a second plurality of segments each having the segment size and the extracted multi-dimensional features;
selecting at least one segment from the first plurality of segments and for each selected segment:
comparing the multi-dimensional features of the segment with the multi-dimensional features of the plurality of segments;
generating a self-similarity matrix having values indicating comparisons of the multi-dimensional features of the selected segment with multi-dimensional features of the second plurality of segments;
selecting a first segment from the first plurality of segments and a second segment from the second plurality of segments, wherein the first and second segments correspond to a value in the self-similarity matrix that is greater than a threshold; and
joining a first portion of the audio signal and a second portion of the audio signal, wherein the first portion of the audio signal includes the first segment, and wherein the second portion of the audio signal includes the second segment.

10. The system of claim 9, wherein the operations further comprise:
extracting, from the audio signal, at least one of a spectrogram, a cochleagram, an amplitude modulation spectrum, or mel-frequency cepstral coefficients.

11. The system of claim 9, wherein the multi-dimensional features comprise at least a spectral distribution on one axis and time on another axis.

12. The system of claim 9, wherein the time difference between the start of adjacent segments is smaller than the segment size.

13. The system of claim 9, wherein the joining of the first portion of the audio signal and the second portion of the audio signal includes overlapping a portion of the first segment and a portion of the second segment.

14. The system of claim 13, wherein the overlapping corresponds to crossfading an ending portion of the first segment with a beginning portion of the second segment.

15. The system of claim 9, wherein the first portion of the audio signal includes audio prior to the first segment and wherein the second portion of the audio signal includes audio after the second segment.

16. The system of claim 9, wherein the first portion of the audio signal includes audio prior to the second segment and wherein the second portion of the audio signal includes audio after the first segment.

17. The system of claim 9, wherein the operations further comprise:
generating an extended audio file, including the joined first and second portions, dynamically during a playback of the audio file.

18. The system of claim 9, wherein the operations further comprise:
generating an extended audio file, including the joined first and second portions, based on a user-provided playback length.

19. A tangible, non-transitory computer readable medium storing computer program instructions, that when executed by a processor, cause operations comprising:
extracting multi-dimensional features from an audio signal;
segmenting the audio signal into a first plurality of segments each having a segment size and extracted multi-dimensional features;
segmenting the audio signal into a second plurality of segments each having the segment size and the extracted multi-dimensional features;
selecting at least one segment from the first plurality of segments and for each selected segment:
comparing the multi-dimensional features of the segment with the multi-dimensional features of the plurality of segments;
generating a self-similarity matrix having values indicating comparisons of the multi-dimensional features of the selected segment with multi-dimensional features of the second plurality of segments;
selecting a first segment from the first plurality of segments and a second segment from the second plurality of segments, wherein the first and second segments correspond to a value in the self-similarity matrix that is greater than a threshold; and
joining a first portion of the audio signal and a second portion of the audio signal, wherein the first portion of the audio signal includes the first segment, and wherein the second portion of the audio signal includes the second segment.

20. The tangible, non-transitory computer readable medium of claim 19, wherein the operations further comprise:
extracting, from the audio signal, at least one of a spectrogram, a cochleagram, an amplitude modulation spectrum, or mel-frequency cepstral coefficients.

* * * * *